United States Patent
Tabuchi (10) Patent No.: US 6,311,227 B1
(45) Date of Patent: *Oct. 30, 2001

(54) PROCEDURE CALLING METHOD

(75) Inventor: Masahiro Tabuchi, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/752,897

(22) Filed: Nov. 20, 1996

(30) Foreign Application Priority Data

Nov. 20, 1995 (JP) .................................... 7-325072

(51) Int. Cl.$^7$ .................................................. G06F 9/355
(52) U.S. Cl. ............................................................ 709/316
(58) Field of Search .................................. 395/680, 684; 709/310, 330, 316, 320

(56) References Cited

U.S. PATENT DOCUMENTS

| | | | | |
|---|---|---|---|---|
| 5,327,562 | * | 7/1994 | Adcock ..................................... | 717/8 |
| 5,442,793 | * | 8/1995 | Christian et al. ..................... | 709/315 |
| 5,475,817 | * | 12/1995 | Waldo et al. .......................... | 709/316 |
| 5,832,219 | * | 11/1998 | Pettus ................................... | 709/203 |
| 5,918,052 | * | 6/1999 | Kruskal et al. ........................... | 717/1 |

FOREIGN PATENT DOCUMENTS

| | | |
|---|---|---|
| 05-241845 | 9/1993 | (JP) . |
| 05-257664 | 10/1993 | (JP) . |
| 05-274151 | 10/1993 | (JP) . |
| 05-274153 | 10/1993 | (JP) . |
| 05-289871 | 11/1993 | (JP) . |
| 06-103075 | 4/1994 | (JP) . |

* cited by examiner

*Primary Examiner*—Zarni Maung
*Assistant Examiner*—Gary Scott Fourson
(74) *Attorney, Agent, or Firm*—Foley & Lardner (57) ABSTRACT

A procedure calling method is provided, in which an appropriate procedure car be mutually called safely between separately-prepared application programs. The method uses a procedure assignment table having paired information about procedure name and procedure address. First, whether the address of a procedure corresponding to a called procedure name is included in a first procedure assignment table or not is judged. When the address of the procedure corresponding to the given name is included in the first procedure assignment table, the address of the procedure is acquired to be executed. When the address of the procedure corresponding to the given name is not included in the first procedure assignment table, whether a retrieval function for retrieving a second procedure assignment table is provided or not is then judged. When the retrieval function is not provided, an error is outputted. When the retrieval function is provided, the retrieval function is then executed to obtain the second procedure assignment table. An additional retrieval function or functions may be further provided, in which an address assignment table including paired information about the name and address of each retrieval function is preferably provided.

8 Claims, 9 Drawing Sheets

PROCEDURE ASSIGNMENT TABLE OF CLASS A1 — 81

| PROCEDURE NAME | ADDRESS |
|---|---|
| func 1 | $A::func 1 |
| func 2 | $A::func 2 |
| . . . | . . . |
| func i | $A::func i |
| . . . | . . . |

FIG. 2B
PRIOR ART

PROCEDURE ASSIGNMENT TABLE OF CLASS A — 82

| PROCEDURE NAME | ADDRESS |
|---|---|
| func 1 | $A::func 1 |
| func 2 | $A::func 2 |
| . . . | . . . |
| func i | $A::func i |
| . . . | . . . |

PROCEDURE CALLING METHOD

BACKGROUND OF THE INVENTION

1. Field of the Invention

The present invention relates to a procedure calling method and more particularly, to a procedure calling method that performs procedure calling in the object-oriented technology.

2. Description of the Prior Art

A procedure calling method which has been most widely accepted in the object-oriented technology is that which uses a paired information table for procedure names and the addresses of procedures represented by the names. The information table is termed a "procedure assignment table". A typical example of the procedures is a function.

Figure 1:
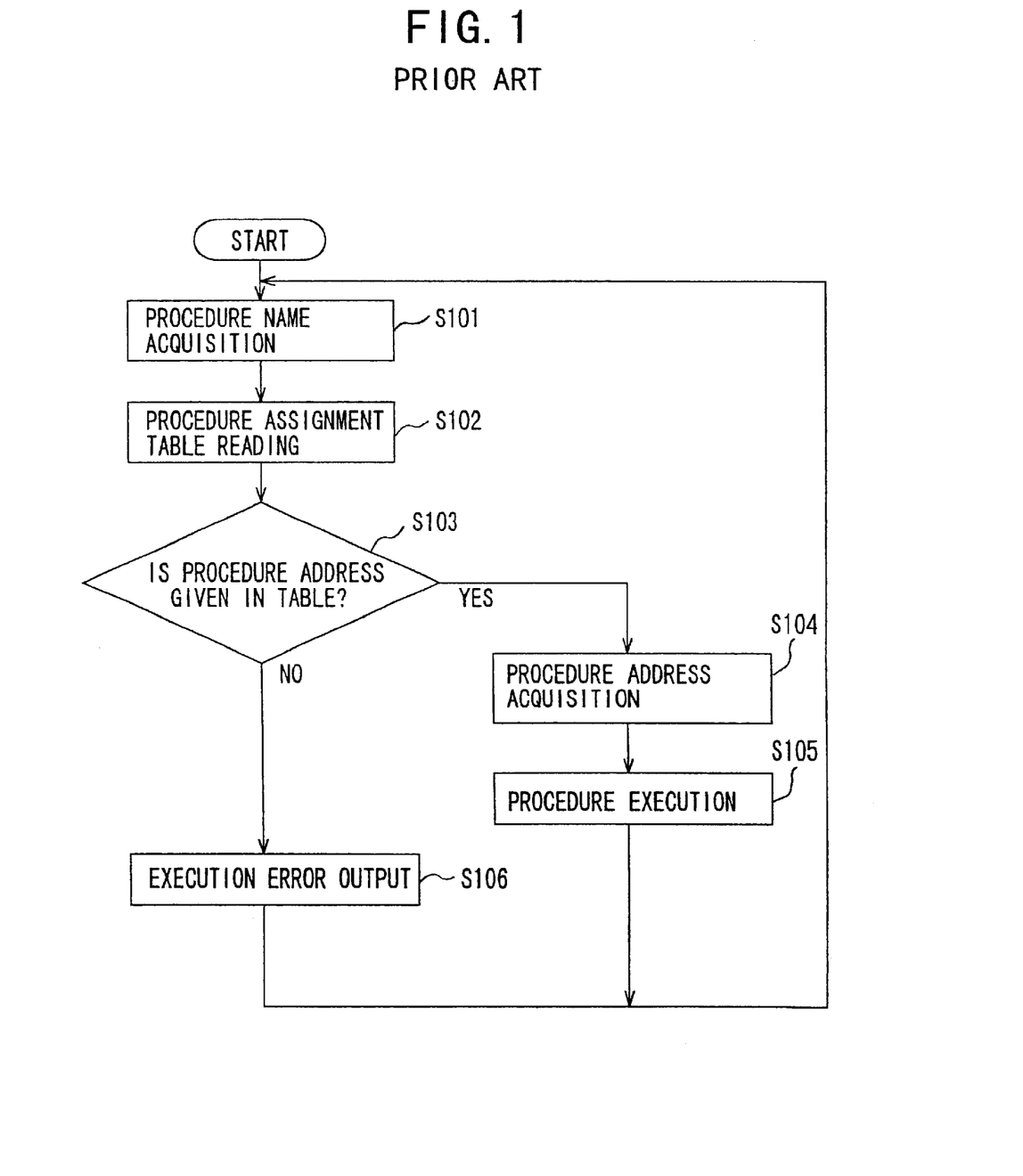
FIG. 1 is a flowchart showing the process steps of a conventional procedure calling method.

An example of the conventional procedure calling methods of this sort is shown in FIG. 1. As shown in FIG. 1, this method contains a procedure name acquisition step S101, a procedure assignment table reading step S102, a procedure address judging step S103, a procedure address acquisition step S104, a procedure execution step S105, and an execution error output step S106.

Figure 2A:
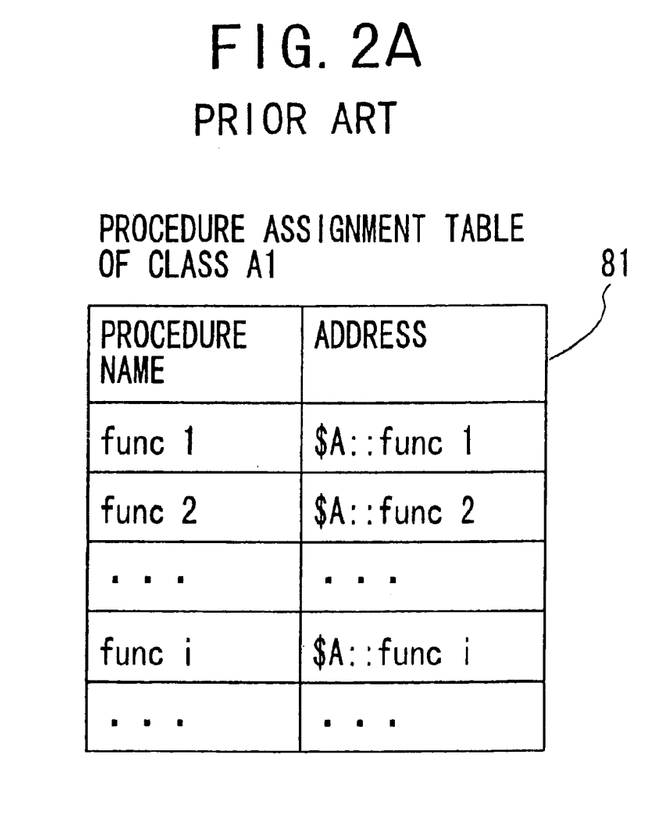
FIG. 2 is a schematic view showing an example of procedure assignment tables, which is used in the conventional procedure calling method of FIG. 1.
Figure 2B:
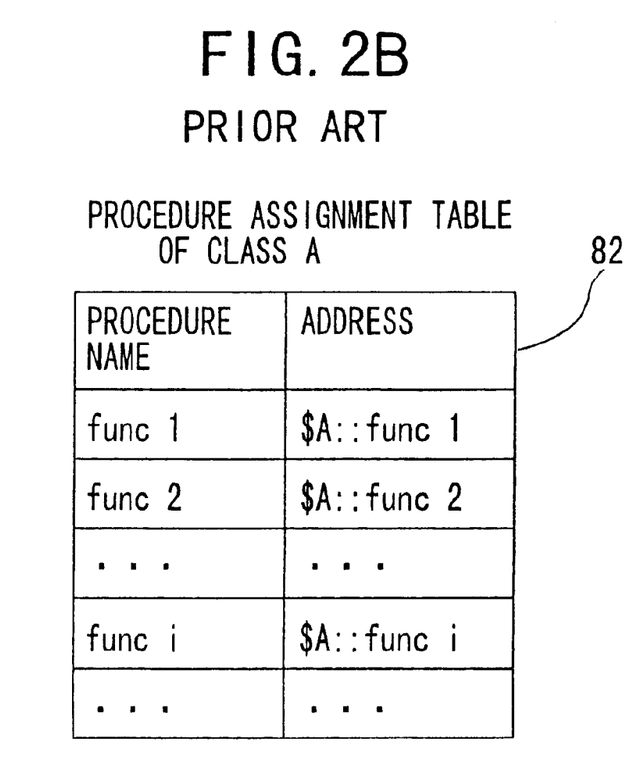

With the conventional procedure calling method of FIG. 1, procedure assignment tables, each of which contains sets of a name and address of a procedure, are previously prepared by a translation system (such as a compiler) of the source program. An example of the procedure assignment table is shown in FIG. 2, in which the reference numeral 81 represents a procedure assignment table of the class A1, and the reference numeral 82 represents a procedure assignment table of the class A.

If a procedure name is specified as the key in the step S101, a corresponding procedure address listed in the corresponding procedure assignment table (for example, the table 81 or 82 in FIG. 2) can be obtained through the seeps S102 to S104. Therefore, if a procedure assignment table is prepared for each class (each of the classes A and A1 in FIG. 2), different processes can we executed with the same procedure name in the tables of the different classes.

When a plurality of procedure assignment tables are provided for a single procedure name, the pertinent procedure assignment table may be determined in executing the program by the execution code prepared by the translation system such as a compiler.

For example, when a derived class is used by defining it from the base class which is equivalent to the root of the inherited hierarchy tree, each of the procedure assignment tables, the number of which is the same as that of the derived classes, is provided with an entry of the same procedure name as that of the base class. In this case, the source program has a statement to which a certain procedure P for an object variable V is applied. If the procedure P is redefined in the derived class, the procedure assignment table is found out and read on the basis of the class information including the class name of the object to be substituted into the object variable V on execution (see step S102 in FIG. 1). Further, a code to determine the execution code for the correct procedure P (see steps S104 and S105 in FIG. 1) is generated by the compiler.

With the conventional procedure calling method as stated above, in which the procedure assignment table is determined for each class name, the procedure assignment table cannot be changed over with an application program. As a result, a problem that it is difficult for an appropriate procedure to be able to be mutually called safely between separately-prepared application programs occurs.

For example, as shown in FIG. 2, it is supposed that an application program contains the definition of the base class A, and another application program contains the definition of the base class A and the definition of a derived class A1 thaw uses the definition of the class A. It is also supposed that the address of the execution code corresponding to a procedure name "func i" of the derived class A1 is set as the address of the execution code for a procedure name "func i" of the base class A, i.e., "$A::func i", as show-n in the procedure assignment tables 81 and 82 of the classes A1 and A.

If the base class A is updated independently of the derived class A1, the execution code stored in the address "$A::func i" in the procedure assignment table 82 of the base class A may be replaced. Therefore, it cannot be assured that the procedure "func i" of the derived class A1 always provides the operation or behavior that was expected by the definition of the class A1.

Figure 3:
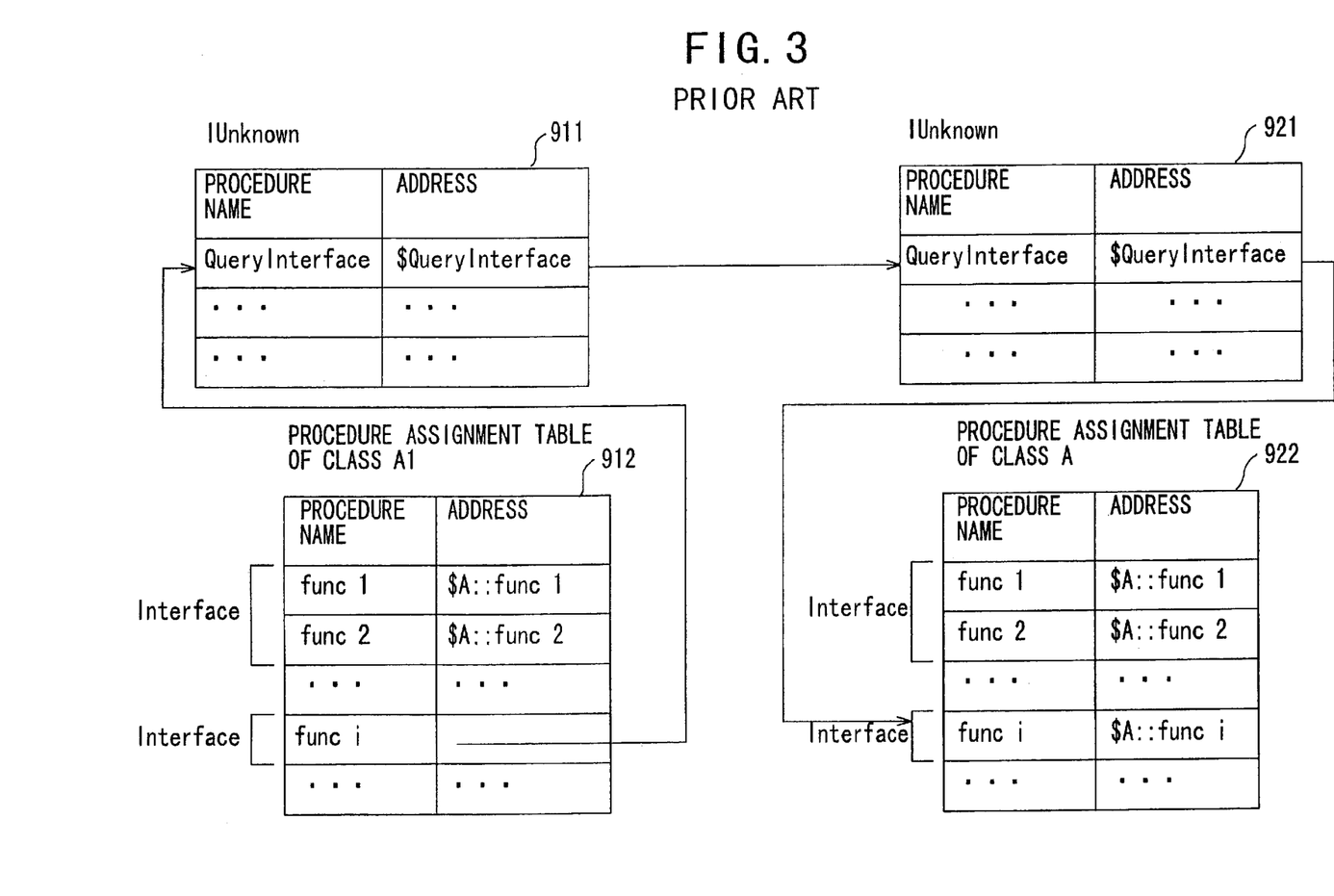
FIG. 3 is a schematic view showing another example of procedure assignment tables, which is used in the Microsoft Component Object Model as another conventional procedure calling method.

To avoid such a problem, the Microsoft Component Object Model adopts a procedure calling method as shown in FIG. 3.

For this procedure calling method of FIG. 3, the address of the function corresponding to the procedure for an object in an application program is not determined by the compiler; but determined through the "QueryInterface" procedures in the special function tables IUnKnown 911 and 921, to which all function tables must be related. These function tables are equivalent to the above-described procedure assignment tables.

With the procedure calling method shown in FIG. 3, the programmer provides an application program so that the "Interface" is defined as a group of functions or procedures in the function table or procedure assignment table, and the reference (i.e., pointer) to the "Interface" corresponds to the return value of the "QueryInterFace" procedure.

In the example in FIG. 3, to allow the function "func i" stored in the procedure assignment table 912 of the derived class A1 to use the execution code for the function, "func i" stored in the procedure assignment table 922 of the base class A, the programmer must provide the "QueryInterface" procedure in the "Iunknown" table 911 related to the class A1 so that the "interface" obtained by the "QueryInterFace" procedure in the "Iunknown" table 921 related to the class A is returned. In other words, in providing the "QueryInterface" procedure for a function listed in the "Iunknown" function table: the programmer must make an explicit statement so that the code to be reused is related.

With the conventional procedure calling method of FIG. 3, since such a contrivance as checking the versions of the class A in FIG. 3 is allowed in making the relationship of the code to be reused, the programmer is able to avoid the above problem in the conventional procedure calling method as shown in FIG. 2.

However, for a function that is certain to be reusable, the programmer must retrieve the code for making the relationship of the code to be reused, and explicitly provide or state it. This causes a problem of an increased load imposed on the programmer.

In addition, because the "Interface" is a group of functions, even when an execution code of the base class (the class A in FIG. 3) is to be reused for only a single function in the "Interface" group, the entire "Interface" must be reused for only the single function, or the same code as that of the base class must be newly stated for its reuse. This causes another problem that efficient reuse of the code is difficult.

SUMMARY OF THE INVENTION

Accordingly, an object of the present invention is to provide a procedure calling method which makes it possible that a procedure can be mutually called safely between separately prepared application programs.

Another object of the present invention is to provide a procedure calling method that allows to safely and efficiently build up an information processing system which uses the object-oriented technology and which includes the combination of separately-prepared application programs.

The above objects together with others not specifically mentioned will become clear to those skilled in the art from the following description.

A procedure calling method according to a first aspect of the present invention uses a procedure assignment table having paired information about procedure name and procedure address, which includes the following steps.

First, whether the address of a procedure corresponding to a called procedure name is included in a first procedure assignment table or not is judged. When the address of the procedure corresponding to the given name is included in the first procedure assignment table, the address of the procedure is acquired to be executed.

When the address of the procedure corresponding to the given name is not included in the first procedure assignment table, whether a retrieval function for retrieving a second procedure assignment table is provided or not is then judged. When the retrieval function is not provided, an error is outputted. When the retrieval function is provided, the retrieval function is then executed to obtain the second procedure assignment table.

With the procedure calling method according to the first aspect of the present invention, when the address of the procedure corresponding to the given name is not included in the first procedure assignment table, whether the retrieval function for retrieving a second procedure assignment table or not is retrieved.

If the retrieval function is found, the second procedure assignment table is able to be retrieved by using the retrieval function thus found, and the wanted procedure corresponding to the given procedure name is executed by using the second procedure assignment table.

Accordingly, the wanted procedure can be mutually called safely between separately-prepared application programs. This allows to safely and efficiently build up an information processing system which uses the object-oriented technology and which includes the combination of separately-prepared application programs.

An additional retrieval function or functions may be further provided in the method according to the first aspect. In this case, an address assignment table including paired information about the name and address of each retrieval function is preferably provided. A wanted one of the retrieval functions is found by using the address assignment tables and the retrieval function thus found is then executed to obtain the second procedure assignment table.

A procedure calling method according to a second aspect of the present invention uses a procedure assignment table having paired information about procedure name and procedure address, which includes the following steps.

First, whether a retrieval function corresponding to a given function name is provided or not is judged in response to a calling. When the retrieval function corresponding to the given name is not provided, an error is outputted. When the retrieval function corresponding to the given name is provided, the retrieval function is executed to obtain a procedure assignment table for a procedure corresponding the calling.

Next, whether the address of the procedure corresponding to the calling is included in the procedure assignment table or not is judged. When the address of the procedure corresponding to the calling is included in the procedure assignment table, the address of the procedure is acquired and the procedure is then executed. When the address of the procedure corresponding to the calling is not included in the procedure assignment table, an error is outputted.

With the procedure calling method according to the second aspect of the present invention, when a retrieval function is called during the execution process of a procedure in order to execute another procedure, first, whether the called retrieval function is provided or not is retrieved.

If the called retrieval Function is found, the retrieval function is executed to obtain a procedure assignment table corresponding to the called procedure. Then, the called procedure is executed by the use of the obtained procedure assignment cable.

Accordingly, the wanted procedure can be mutually called safely between separately-prepared application programs. This allows to safely and efficiently build up an information processing system which uses the object-oriented technology and which includes the combination of separately-prepared application programs.

Similar to the method according to the first aspect, an additional retrieval function or functions may be further provided in the method according to the second aspect. In this case, an address assignment table including paired information about the name and address of each retrieval function is preferably provided. A wanted one of the retrieval functions is found by using the address assignment table, and the retrieval function thus found is then executed to obtain the procedure assignment table.

BRIEF DESCRIPTION OF THE DRAWINGS

In order that the invention may be readily carried into effect, it will now be described with reference to the accompanying drawings.

DETAILED DESCRIPTION OF THE PREFERRED EMBODIMENTS

Preferred embodiments of the present invention will be described below by referring to the drawings.

First Embodiment

Figure 4:
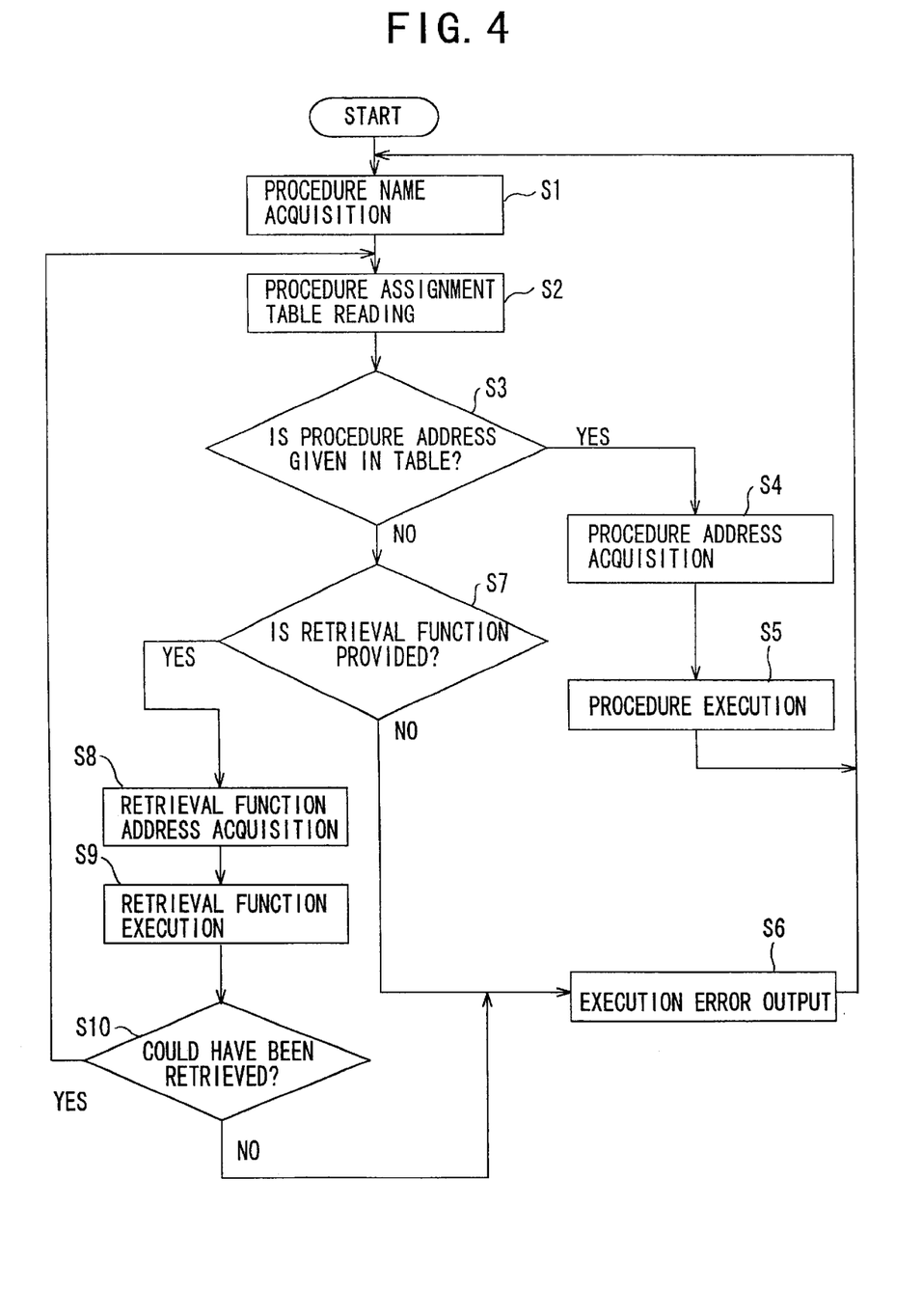
FIG. 4 is a flowchart showing the process steps of a procedure calling method according to a first embodiment of the present invention.
Figure 5:
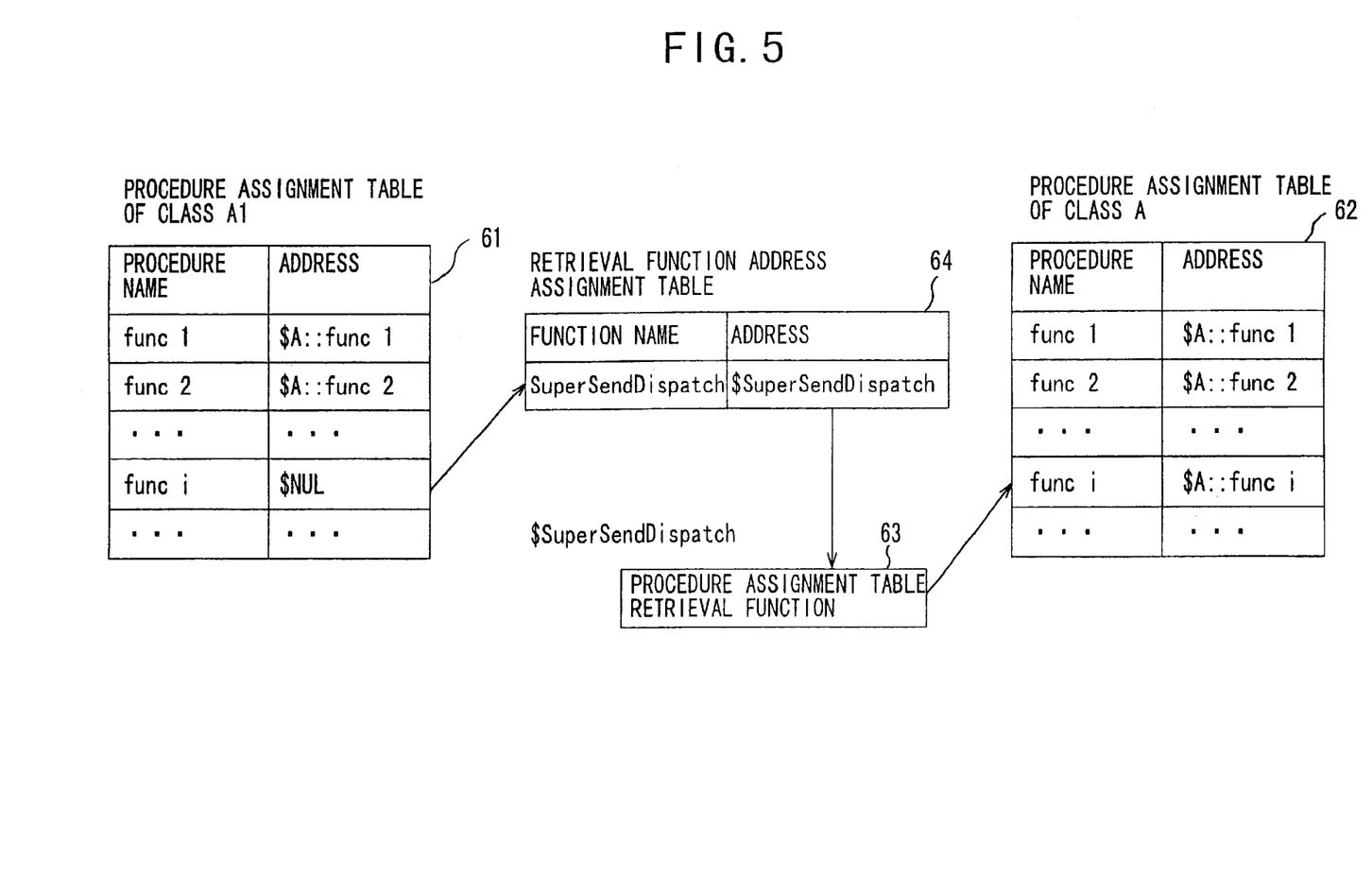
FIG. 5 is a schematic view showing an example of procedure assignment tables and a retrieval function address assignment table, which is used in the method according to the first embodiment.

A procedure calling method according to a first embodiment of the present invention is shown in FIGS. 4 and 5, which corresponds to an extension of the conventional procedure calling method of FIG. 1.

As shown in FIG. 4, the method according to the first embodiment has ten steps S1 to S10.

The step S1 is an acquisition step of a procedure name. The step S2 is a reading step of a procedure assignment table. The step S3 is a judging step of the presence or absence of a procedure address corresponding to the procedure name. The step S4 is an acquisition step of the procedure address. The step S5 is an execution step of the procedure. The step S6 is an output step of an execution error for the procedure. The step S7 is a judging step of the presence or absence of a retrieval function for another procedure assignment table. The step 38 is an acquisition step of the address of the retrieval function. The step S9 is an execution step of the retrieval function. The step S10 is a judging step of the presence or absence of the procedure assignment table thus retrieved.

With the conventional procedure calling method show in FIG. 1, when a procedure name is used to make procedure calling, the procedure name is first acquired (step S101) The acquired procedure name is used as a key to read and retrieve the procedure assignment table prepared by the translation system such as a compiler (steps S102 and S103). If the address of the procedure is given in the procedure assignment table, the address of the procedure is acquired (step S104), and the code corresponding to the acquired address is executed (step S305). Then, the process control is returned to the start of the process flow of FIG. 1.

If the address of the procedure is not given in the procedure assignment table, the execution error is outputted (step S106) and then, the control is returned to the start of the process flow of FIG. 1.

With the procedure calling method according to the first embodiment of the invention shown in FIG. 4, the process steps S1 to S6 are the same as those of the conventional method of FIG. 1. Therefore, the description about these steps S1 to S6 is omitted here for the sake of simplification.

The procedure calling method according to the first embodiment is equivalent to the combination of the steps S101 to S106 of the conventional method of FIG. 1 and newly added steps S7 to S10. Specifically, when an application program has a function (reserved function.) whose name is preset by a system (i.e., object-oriented information processing system) to retrieve a procedure assignment table, the steps S7 to S10 for retrieving an appropriate procedure assignment table by the use of the function are added to the conventional steps S101 to S106.

FIG. 5 schematically illustrates the operation or behavior given by the procedure calling method according to the first embodiment.

As shown in FIG. 5, when the address of the procedure corresponding to a certain procedure name is determined in compiling, the set of the name and address of the procedure is directly registered in the procedure assignment tables 61 and 62 which are read our in the step 52 and referenced in the step S3. For example, <func 1, $A1::func 1>, which means a set of the function "func 1" and the corresponding address "$A1::func 1" is directly registered.

On the other hand, when the address of the procedure corresponding to a certain procedure name is dynamically determined, a special symbol or specific address is registered in the item of "address" for the procedure. For example, the address "$NUL" shown in FIG. 5 is registered, Please refer to the entry of the function "func i" and the corresponding address "$NUL", i.e., <func i, $NUL>, in the table 61.

Next, the operation by the procedure calling method according to the first embodiment thus configured will be described in detail below.

When a procedure name is used to call a wanted procedure to be performed, the procedure name is acquired (step S1). The procedure assignment table corresponding to the procedure name thus acquired is read out to be referred (step S2). Then, whether the address of the procedure corresponding to the given procedure name (i.e., the address determined in compiling rather than a special symbol or specific address) is included in the procedure assignment table or not is judged (step S3).

When, in the step S3, it is judged that "the address of the procedure corresponding to the called procedure name is giver, in the procedure assignment table" (i.e., when the address of the procedure name is not $NUL), the address of the procedure is acquired in the step S4 and is executed in the step S5. Then, the control is returned to the process in the step S1. These process steps are the same as those of the conventional method of FIG. 1.

On the other hand, when, in the step S3, is judged that "the address of the procedure corresponding to the called procedure name is not given in the procedure assignment table (which is assumed to be the procedure assignment table 61 in FIG. 5)", i.e., when the address is "$NUL", whether the retrieval function 63 for retrieving the procedure assignment cable that is registered with the predefined function name by the programmer is provided or not is judged in the step S7.

The execution code for the retrieval function 63 is provided in this application program by the programmer, and is executed by the system. For example, as shown in FIG. 5, if the function with a name of "SuperSendDispatch" is defined as the retrieval function 63, the code for calling a procedure assignment table by using the class name of the retrieving class ("A1" in FIG. 5) and the procedure name of the retrieved class ("func i" in FIG. 5) as arguments is set to the execution code given in the address of "$SuperSendDispatch" when the address is "$NUL".

In other words, the programmer makes a statement in the execution code corresponding to the function name of "SuperSendDispatch" so that the procedure assignment table is retrieved with the class name ("A1", for example) and the procedure name ("func i", for example) are used as keys.

When, in the step S7, it is judged that "the retrieval function 63 is provided for retrieving the procedure assignment table", the address of the retrieval function 63 ("$SuperSendDispatch" in FIG. 5, is acquired in the step S8. The retrieval function 63 (the function with a function name of "SuperSendDispatch" in FIG. 5) that is given in the place of the acquired address is executed in the step S9.

The address of the retrieval function 63 that is acquired in the step S8 is previously held by the system. It can be assumed that the address holding is made in the form or a single-entry table 64 as shown in FIG. 5.

When it is judged what "the retrieval function 653 is not provided" in the step S7, an execution error is outputted in the step S6.

Then, in the step 10, it is judged whether the desired procedure assignment table (the procedure assignment table 62 of the class A in FIG. 5) could have been retrieved or not by the execution or the retrieval function 63 in the step S9.

When, it is judged that "the desired procedure assignment table could have been retrieved in the step 10, the wanted procedure assignment table is read out in the step S2. The procedure thus read out is then executed in the step S5 after the completion of the steps S3 and S4.

For example, in FIG. 5, the procedure with a procedure name of "func i" that is given in the place of the address of "$A::func i" is executed in the step S5.

On the other hand, when it is judged that "the desired procedure assignment table could not have been retrieved", an execution error is outputted in the step S6.

With the procedure calling method according to the first embodiment, when the address of the procedure corresponding to the called name is not included in the procedure assignment table of this application program, it is retrieved whether the retrieval function for retrieving another procedure assignment table or not in the other application program.

If the retrieval function is found in the other application program, the wanted procedure assignment table is able to be retrieved by the use of the retrieval function thus found, and the wanted procedure corresponding to the given procedure name is executed by using the procedure assignment table thus found.

Accordingly, the wanted procedure can be mutually called safely between separately-prepared application programs. This allows to safely and efficiently build up an information processing system which uses the object-oriented technology and which includes the combination of separately-prepared application programs.

In other words, if the procedure calling method according to the first embodiment is used, an object made by the use of a plurality of application programs can be utilized in each of the plurality of application programs.

For the procedure calling method according to the first embodiment described above, the following technical extensions or variations (a), (b), and (c) can be made.

(a) For simplifying the statement of the retrieval function for retrieving the procedure assignment table in the application program, a function that sequentially acquires the addresses in the procedure assignment table of an upper class in the inherited hierarchy and/or a function that acquires the procedure assignment table related to a specific class name may be added to the system as a library or middleware. These ideas are readily conceived from the first embodiment explained here.

For example, if the programmer provides the retrieval function so that it returns the address in the procedure assignment table of an upper class where retrieval is successfully made for the first time when the class hierarchy is traced upward, the same effect as that of the case where the compiler directly writes the address of the procedure of the upper class into the procedure assignment table is obtained.

(b) The procedure assignment table from which the address of the required procedure can be acquired is not always provided in the nearest Upper class in the hierarchy. Accordingly, there is the possibility that the processes in the steps S8 and S9 in FIG. 4 are repeatedly executed. Such a repeated process is logically tolerated in the fist embodiment.

In this case, in the judgment or confirmation in the step S10, it is judged "whether the desired procedure assignment table could have been retrieved or not" in any one of all the repeated steps S9.

The procedure to prevent the retrieval function from returning the procedure assignment table from which the address of the procedure could not have been acquired once may be added by passing the number of call times as an argument for the retrieval function or by counting the number of call times with a global variable. These variations can be easily analogized as a form of the first embodiment.

(c) When the class A1 (a derived class) in FIG. 5 and the class A (the base class) in FIG. 5 exist in different application programs, and the class A1 reuses a certain procedure of the class A, a contrivance such as that of comparing the versions of the classes to find the procedure assignment table of the class that is matched to the version in the retrieval function 63 provided by the programmer can be afforded.

With the previously stated Microsoft Component Object Model (see FIG. 3), when such "the process of comparing the versions of classes" as this is to be reused, it must be reused in providing the function table "IUnknown" for each "Interface" to be reused. Contrarily, the method of the first embodiment is efficient, because there is no need for making such the reuse process except in providing the retrieval function.

Second Embodiment

Figure 6:
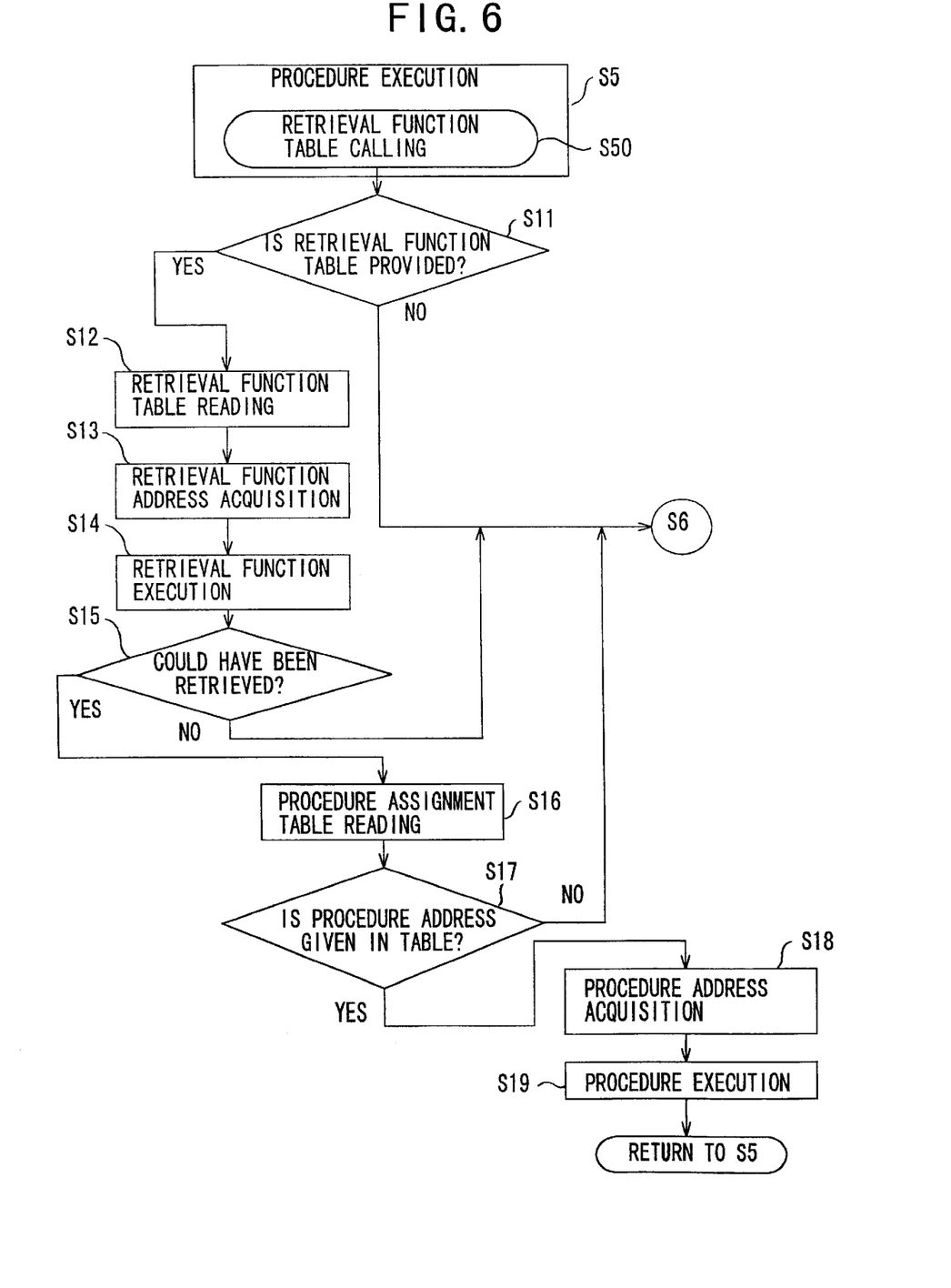
FIG. 6 is a flowchart showing the process steps of the procedure calling method according to the second embodiment of the present invention.

FIG. 6 is a flowchart showing the process steps of a procedure calling method according to a second embodiment, which is an extended example for the conventional procedure calling method as shown in FIG. 1.

The method according to the second embodiment is equivalent to the combination of series of processes and judgments (steps S11 to S19) as shown in FIG. 6 and the conventional method of FIG. 1. In other words, it is equivalent to the combination of the steps S11 to S19 shown in FIG. 6 and the steps S1 to S6 in the method according to the first embodiment of FIG. 4. Therefore, the description about the steps S1 to S6 is omitted here for the sake of simplification.

The steps S11 to S19 are started from a step S50 of calling a retrieval function. The step S50 is executed during the processes of the procedure execution step S5.

In FIG. 6, the step S11 is a judging step of judging whether the assignment table or the called retrieval function is provided or not. The step S12 is a reading step of reading the address assignment table of the retrieval function. The step S13 is an address acquisition step of the address assignment table of the retrieval function. The step S14 is an execution step of the retrieval function. The step S15 is a judging step S15 of judging whether the procedure assignment table has been retrieved or not. The step S16 is a reading step of the procedure assignment table thus retrieved. The step S17 is a judging step of judging whether the procedure address is included in the retrieved procedure assignment table or not. The step S18 is an address acquisition step of the called procedure. The step S19 is an execution step or the called procedure.

Figure 7:
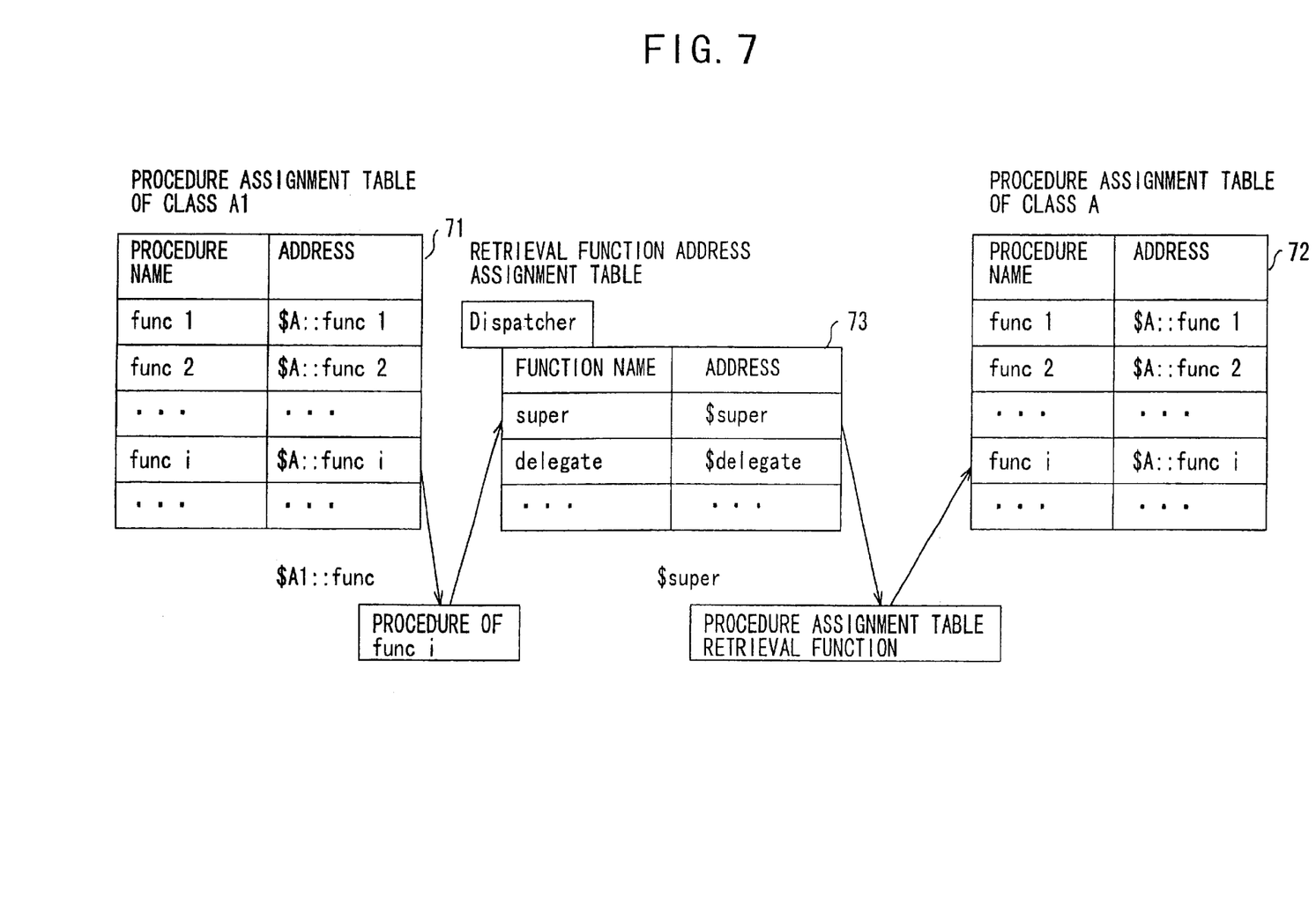
FIG. 7 is a schematic view showing an example of procedure assignment tables and a retrieval function address assignment table, which is used in the method according to the second embodiment.

FIG. 7 schematically illustrates the operation or behavior performed by the procedure calling method according to the second embodiment.

In FIG. 7, "Dispatcher" represents the name for referring the address assignment table 73 of the retrieval function, and "super" and "delegate" are the names of the preset retrieval functions for the procedure assignment tables 71 and 72, respectively.

The procedure calling method of the second embodiment has the following characteristics (i), (ii), (iii), and (iv), compared with the procedure calling method according to the first embodiment.

(i) A plurality of retrieval functions for retrieving the procedure assignment table are predefined.

(ii) The address assignment table for the retrieval functions (the retrieval function address assignment table 73 in FIG. 7) is provided for storing the "names" and "addresses" of these retrieval functions.

(iii) The sequence that uses the address assignment table for the retrieval functions (the retrieval function address assignment table 73 in FIG. 7) to allow a particular retrieval function to be specified is added to the procedure calling method according to the first embodiment.

(iv) During the execution of a procedure once called in course of the process or processes of the procedure execution step S5), another procedure is called to be executed.

Next, the operation by the procedure calling method according to the second embodiment thus configured will be described in detail below.

During the process of the procedure execution step S5, i.e., during the execution process of the procedure with a procedure name of "func i" located in the address or the "$A1::func i" in FIG. 7, the name (for example, "Dispatcher" in FIG. 7) of the address assignment table 73 of the retrieval function, the name (for example, "super" in FIG. 7) of the desired retrieval function for the procedure assignment table, and the procedure name (for example, "func i" in FIG. 7) are specified, and then, the address assignment table 73 is called in the step S50.

In response to the call in the step S50, it is judged whether the address assignment table for the retrieval function (for example, the retrieval function address assignment table 73 in FIG. 7) with the specified name (for example, "Dispatcher" in FIG. 7) is included or not in the step S11.

When, in the step S11, it is judged that "the address assignment table for the retrieval function (the retrieval function address assignment table 73 in FIG. 7) is provided", this table is read out in the stem S12. Then, with the name of the specified retrieval function (for example, "super" in FIG. 7), the address of the retrieval function (For example, "$super" in FIG. 7) is acquired from the address assignment table in the step S13.

Then, the retrieval function given in the place of the address acquired in the step S13 (for example, the retrieval function with a name of "super" that is given in the address of "$super" in FIG. 7) is executed in the step S14.

Further, it is judged whether the procedure assignment table having the entry of the specified procedure name (for example, "func i" in FIG. 7) is prepared as the procedure assignment table of the desired class (for example, the procedure assignment table 72 of class A in FIG. 7) or not in the step S15. In other words, whether the desired procedure assignment table could have been retrieved or not is judged in the step S15.

When, in the step S15, it is judged that "the desired procedure assignment table could have been retrieved", the procedure assignment table, which is a called procedure assignment table (the procedure assignment table 72 in FIG. 7), is read out in the step S16.

Then, whether the address (i.e. the address of the specified procedure) corresponding to the specified procedure name ("func 1" in FIG. 7) in the procedure assignment table (the table 72 in FIG. 7) is included or not is judged in the step S17.

When, in the step S17, it is judged that "the address corresponding to the specified procedure name is included", the address of the called procedure is acquired in the step S18, and the called procedure is executed in the step S19. After the execution in the step S19, the control is returned to the process of the procedure execution step S5 in FIG. 1.

When, in the step S11, it is judged that "the address assignment table for the retrieval function is not provided, an execution error is outputted in the step S6. The same execution error is outputted when it is judged that "the desired procedure assignment table could not have been retrieved" in the step S15, and when it is judged that "the address corresponding to the specified procedure name is not included" in the step S17.

With the procedure calling method according to the second embodiment, when a retrieval function (for example, "Dispatcher" in FIG. 7) is called during the execution process of a procedure (for example, "func i" in FIG. 7) in order to execute another procedure, whether the called retrieval function is provided or not is first retrieved.

If the called retrieval function is found, the retrieval function is executed to obtain a procedure assignment table corresponding to the called Procedure. Then, the called procedure is executed by the use of the obtained procedure assignment table.

Accordingly, the wanted procedure can be mutually called safely between separately-prepared application programs. This allows to safely and efficiently build up an information processing system which uses the object-oriented technology and which includes the combination of separately-prepared application programs.

With the procedure calling method according to the second embodiment, the above-described characteristics (i), (ii), and (iii) allow the programmer to select a desired retrieval function from the plurality of retrieval functions. The above characteristic (iv) allows the programmer to give not only an instruction or making an ancestral retrieval that sequentially traces the class hierarchy tree toward the root, but also an instruction for entrusting the process to the execution code for the function of a specific class.

The programmer is able to specify an offset from the address "$Dispatcher" in the retrieval function address assignment table 73 with a name of "Dispatcher" located in the place of the address "$Dispatcher" in the code for the procedure name "func i" of the class A1. This "offset specification" is equivalent to "function name specification" in the address assignment table 73 in FIG. 7. Thuds the address of the procedure assignment table retrieval function with a function name such as "super" and "delegate" can be acquired. This makes at possible that the programmer makes a statement (i.e., statement of an application program) for realizing the assignment of the procedure to an appropriate class.

For example, if the execution code for the retrieval function with a function name of "super" is provided so that it returns the address of the execution code for the procedure corresponding to the same procedure name of the ancestral class by comparing the versions of the classes, the same effects or advantages as those of in the first embodiment can be expected.

In addition, the procedure calling method according to the second embodiment allows the programmer to specify that, for the execution code for another procedure of the class A1, the retrieval function for the procedure which car be referred by the function name "delegate" is called.

For example, if the programmer states that, as the execution code for the retrieval function that can be referred with the name "delegate", the procedure assignment table of a specific class which is not given in the ancestor of the class hierarchy is retrieved, he can specify or select the capability equivalent to the "delegation" function one even with a compiler for a language having no "delegation" capability.

Third Embodiment

In the method according to the above second embodiment, the concept of "setting of a plurality or retrieval functions" and that of "calling of another procedure during execution of a procedure" are added to the method according to the first embodiment. On the other hand, only the concept of "setting of a plurality of retrieval functions" or that of "calling of another procedure during execution of a procedure" can be added to the first embodiment.

Figure 8:
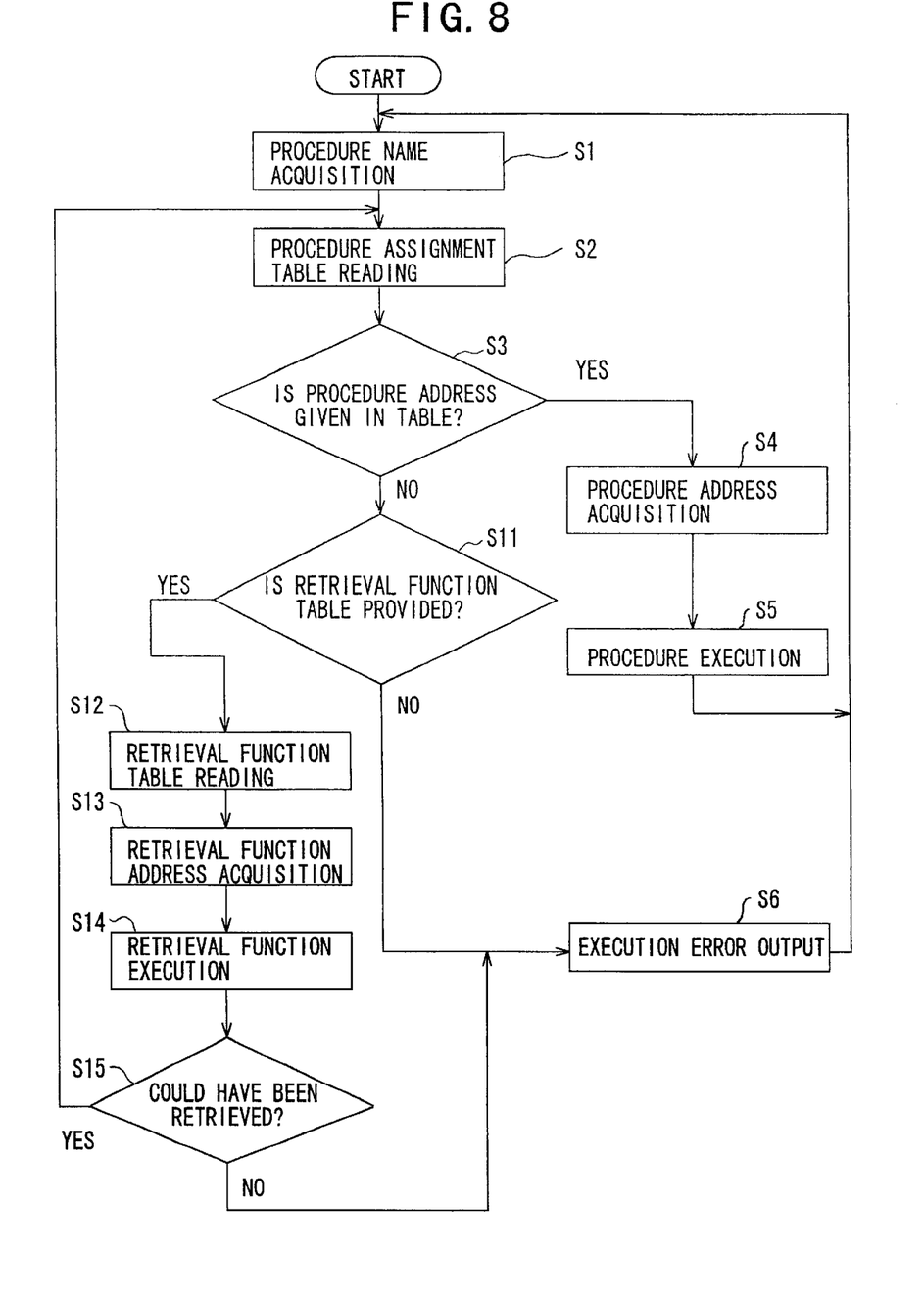
FIG. 8 is a flowchart showing the process steps of the procedure calling method according to a third embodiment of the present invention.

FIG. 8 is a flowchart showing a procedure calling method according to a third embodiment of the invention, in which only the concept of "setting of a plurality of retrieval functions" is added to the first embodiment.

In FIG. 8, the steps S1 to S6 are the same as those in the first embodiment of FIG. 4, and the steps S11 to S15 are the same as those in the second embodiment of FIG. 6, respectively.

The method according to the third embodiment is equivalent to that obtained by a plurality of retrieval functions are prepared in the method according to the first embodiment instead of a single retrieval function.

Fourth Embodiment

Figure 9:
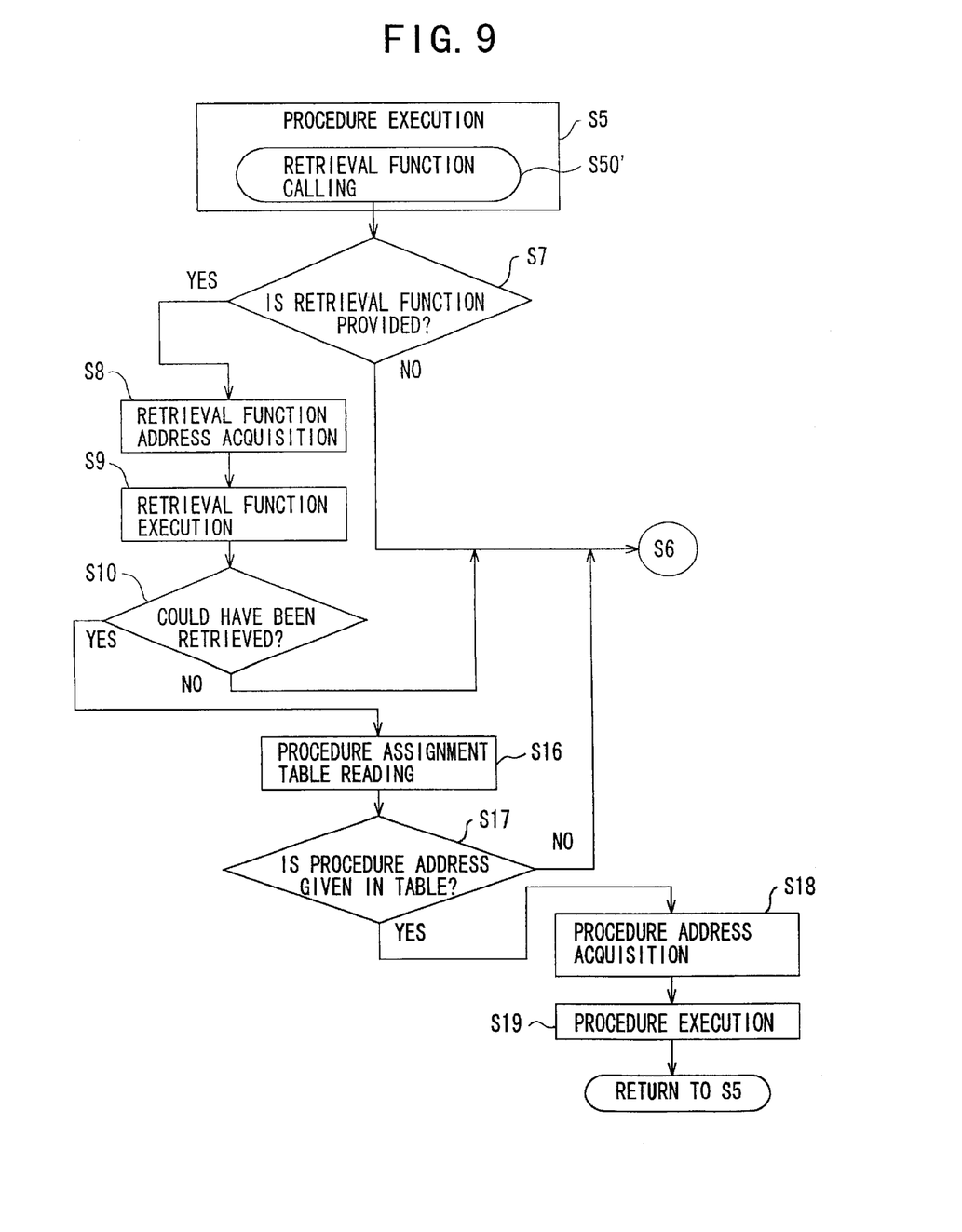
FIG. 9 is a flowchart showing the process steps of the procedure calling method according to a fourth embodiment of the present invention.

FIG. 9 is a flowchart showing a procedure calling method according to a fourth embodiment, in which only the concept of "calling of another procedure during execution of a procedure" is added to the method according to the first embodiment.

In FIG. 9, the steps S5 to S10 are the same as those in the first embodiment of FIG. 4, the steps S11 to S15 are the same as those in the second embodiment of FIG. 6, the steps S17 to S19 are the same as the steps S103 to S105 in the conventional method of FIG. 1, respectively.

The method according to the fourth embodiment is equivalent to that obtained by a single retrieval function is prepared in the method according to the second embodiment instead of a plurality of retrieval functions.

The first process step S50' is a step of "calling a retrieval function", which is different from the second embodiment in which the first process step is S50 is a step of "calling a procedure assignment table".

In the above-described first to fourth embodiments, the retrieval functions or functions for the procedure assignment table is able to either be stated by the programmer or be previously provided as a function or functions inherent in the system.

The former technique that the programmer states the retrieval function or functions provides an additional advantage that the programmed with an increased freedom of statement for procedure calling. On the other hand, the latter technique that the retrieval function or functions is/are provided as a function inherent in the system provides an additional advantage that the load imposed on the programmer is decreased in making a statement for procedure calling.

The method that allows the developer (such as the programmed) to select a compile option, rather that the compiler making a decision, can be easily analogized form the present invention. By allowing the programmer to give an instruction rather than the compiler making an automatic decision, an additional advantage that a procedure can be called with greater safety arises.

As described above, with the procedure calling method according to the present invention, since the procedure assignment retrieval function or functions is/are provided, the procedure assignment table that is used with procedure calling can be replaced, and an appropriate procedure table can be determined for individual application programs.

Specifically, if a procedure that cannot he realized with an application program is provided while a plurality of application programs being run, the procedure can be executed by finding out some other application that is correctly provided with that procedure, through the replacement of the procedure assignment table.

In addition, if the method according to the present Invention is applied to procedure calling in an application program using an object-oriented language or other, procedures are able to be safely shared between a plurality of separate applications.

Therefore, an advantage that the program capacity of the individual application programs is minimized car be expected.

Further, by combining a plurality of application programs, a new application program to meet the demand of users can be generated.

While the preferred forms of the present invention have been described, it is to be understood that modifications will be apparent to those skilled in the art without departing from the spirit of the invention. The scope of the invention, therefore, is to be determined solely by the following claims.

What is claimed is:

1. A procedure calling method which uses a procedure assignment table having paired information about procedure name and procedure address;

said method comprising the steps of:
    judging whether the address of a procedure corresponding to a called procedure name is included in a first procedure assignment table of a first application program or not;
    acquiring the address of said procedure corresponding to said called name when the address of said procedure corresponding to said called name is included in said first procedure assignment table;
    executing said procedure corresponding to said called name using the acquired address using said first procedure assignment table;
    judging whether a retrieval function for retrieving a second procedure assignment table of a second application program is provided or not, when the address of said procedure corresponding to said called name is not included in said first procedure assignment table;
    outputting an error, when said retrieval function is not provided; and
    executing said retrieval function to obtain said second procedure assignment table, when said retrieval function is provided.

2. A method as claimed in claim 1, wherein an additional retrieval function is provided;
    and wherein paired information about function name and function address of said retrieval function and said additional retrieval function are listed in an address assignment table;

and wherein said judging step of the presence and absence of said retrieval function is executed using said address assignment table;

and wherein one of said retrieval function and said additional retrieval function is selected to be used for retrieving said second procedure assignment table.

3. A procedure calling method which uses a procedure assignment table having paired information about procedure name and procedure address;

said method comprising the steps of:
acquiring a procedure name of a procedure to be executed;
reading a procedure assignment table;
judging whether the address of said procedure to be executed is included in a first procedure assignment table of a first application program or not;
acquiring the address of said procedure to be executed when the address of said procedure to be executed is included in said first procedure assignment table;
executing said procedure to be executed using said first procedure assignment table;
judging whether a retrieval function for retrieving a second procedure assignment table of a second application program is provided or not, when the address of said procedure to be executed is not included in said first procedure assignment table;
outputting an errors when said retrieval function is not provided;
executing said retrieval function to obtain said second procedure assignment table, when said retrieval function is provided; and
executing said procedure to be executed using said second procedure assignment table.

4. A method as claimed in claim 3, wherein an additional retrieval function is provided;

and wherein paired information about function name and function address of said retrieval function and said additional retrieval function are listed in an address assignment table;

and wherein said judging step of the presence and absence of said retrieval function is executed using said address assignment table;

and wherein one of said retrieval function, and said additional retrieval function is selected to be used for retrieving said second procedure assignment table.

5. A procedure calling method which uses a procedure assignment table having paired information about procedure name and procedure address;

said method comprising the steps of:
judging whether the address of a procedure corresponding to a called procedure name is included in a first procedure assignment table of a first application program or not;
acquiring the address of said procedure corresponding to said called name when the address of said procedure corresponding to said called name is included in said first procedure assignment table, where the address of said procedure is included in said first procedure assignment table upon compiling;
executing said procedure corresponding to said called name using the acquired address using said first procedure assignment table;
judging whether a retrieval function for retrieving a second procedure assignment table of a second application program is provided or not, when the address of said procedure corresponding to said called name is not included in said first procedure assignment table;
outputting an error, when said retrieval function is not provided; and
executing said retrieval function to obtain said second procedure assignment table, when said retrieval function is provided.

6. A method as claimed in claim 5, wherein an additional retrieval function is provided;

and wherein paired information about function name and function address of said retrieval function and said additional retrieval function are listed in an address assignment table;

and wherein said judging step of the presence and absence of said retrieval function is executed using said address assignment table;

and wherein one of said retrieval function and said additional retrieval function is selected to be used for retrieving said second procedure assignment table.

7. A procedure calling method which uses a procedure assignment table having paired information about procedure name and procedure address;

said method comprising the steps of:
acquiring a procedure name of a procedure to be executed;
reading a procedure assignment table;
judging whether the address of said procedure to be executed is included in a first procedure assignment table of a first application program or not;
acquiring the address of said procedure to be executed when the address of said procedure to be executed is included in said first procedure assignment table, where the address of said procedure is included in said first procedure assignment table upon compiling;
executing said procedure to be executed using said first procedure assignment table;
judging whether a retrieval function for retrieving a second procedure assignment table of a second application program is provided or not, when the address of said procedure to be executed is not included in said first procedure assignment table;
outputting an error, when said retrieval function is not provided;
executing said retrieval function to obtain said second procedure assignment table, when said retrieval function is provided; and
executing said procedure to be executed using said second procedure assignment table.

8. A method as claimed in claim 7, wherein an additional retrieval function is provided;

and wherein paired information about function name and function address of said retrieval function and said additional retrieval function are listed in an address assignment table;

and wherein said judging step of the presence and absence of said retrieval function is executed using said address assignment table;

and wherein one of said retrieval function and said additional retrieval function is selected to be used for retrieving said second procedure assignment table.

* * * * *